UNITED STATES PATENT OFFICE.

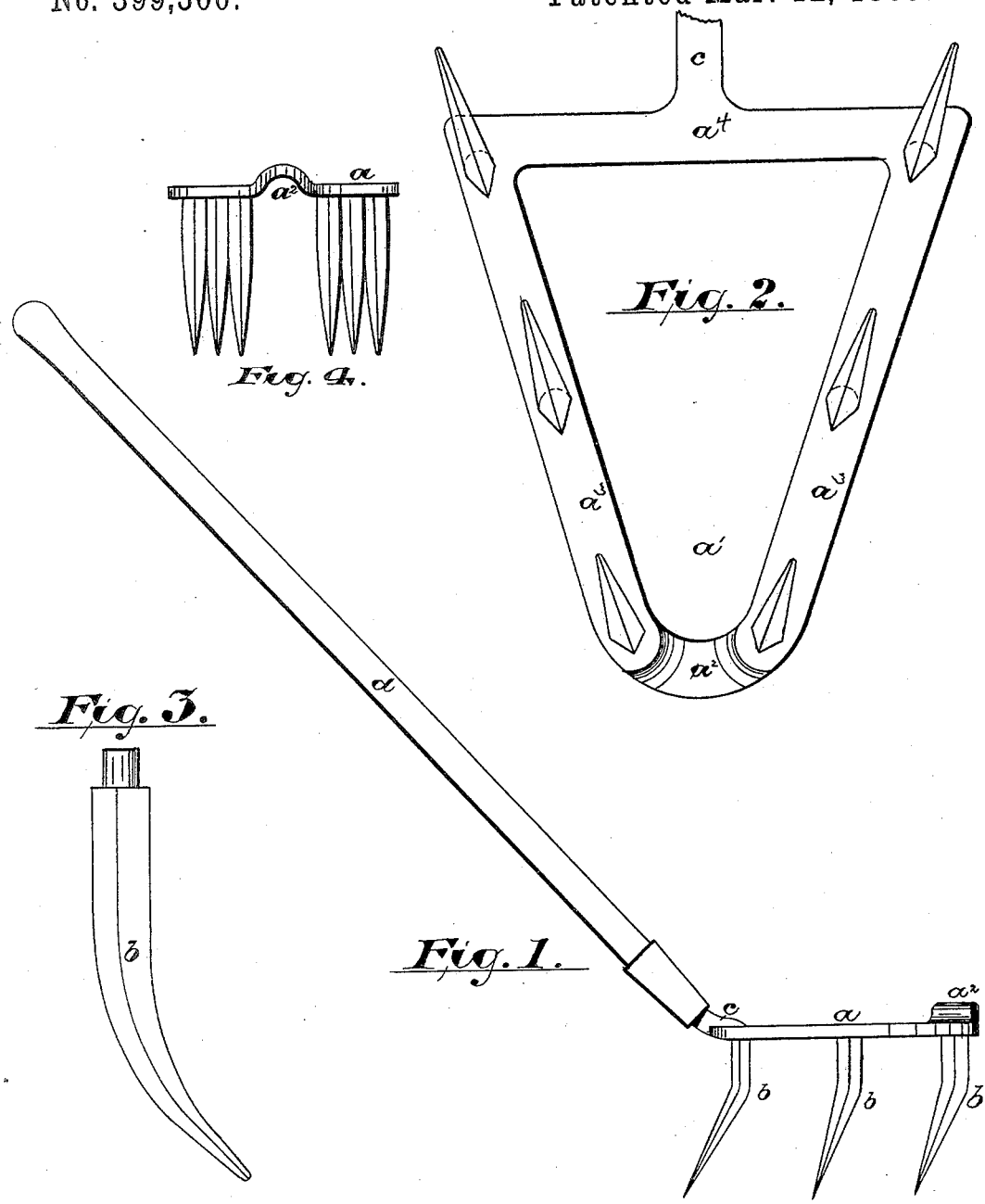

KARL VOIGT, OF NEWARK, NEW JERSEY.

HAND-CULTIVATOR.

SPECIFICATION forming part of Letters Patent No. 399,300, dated March 12, 1889.

Application filed June 20, 1887. Serial No. 241,840. (No model.)

*To all whom it may concern:*

Be it known that I, KARL VOIGT, a citizen of the United States, residing at Newark, in the county of Essex and State of New Jersey, have invented certain new and useful Improvments in Hand - Cultivators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of hand-cultivators in which the individual devices are each provided with a toothed plate or bed-piece having a single central handle adapted to allow the cultivator to be handled as an ordinary hoe or rake is handled, both hands of the gardener being applied to the one central piece at different points in its length, as will be understood.

The object of the invention is to secure greater efficiency in operation and to reduce the liability to injure the plants, to reduce the cost of construction, and secure greater durability and strength.

The invention consists in the improved hand-cultivator having the arrangements and combinations of parts substantially as will be hereinafter set forth, and finally embodied in the clauses of the claim.

Referring to the accompanying drawings, in which like letters indicate corresponding parts in each of the figures, Figure 1 is a side elevation of the improved hand-cultivator. Fig. 2 is a plan of the under side of the same, the handle being detached from the toothed body or bed-plate thereof. Fig. 3 is a side view of a prong in detail; and Fig. 4 is a front view of the said toothed body, showing a certain recess therein to allow of the passage of the leaves of the plant to prevent their being broken off.

In said drawings, $a$ indicates a frame or body consisting of two side parts, $a^3\ a^3$, and a rear or basic part, $a^4$, which together form a triangle, as shown in Fig. 2. Said parts $a^3\ a^3\ a^4$ are integrally formed at their very extremities. The said parts thus do not at their extremities extend past one another to form projecting arms, which would render the device very objectionable, inasmuch as the said arms would tend to catch upon the leaves and tendrils or branches of the plant, and thus greatly injure the same; but the said sides thus connected are continuous and form a regular triangle, excepting that the corners are more or less rounded, to further limit the catching qualities of the device.

The side parts, $a^3\ a^3$, have disposed on the under side thereof series of backwardly-turned and sharpened teeth or cultivating-prongs $b\ b$, and the third basic part, subtending the forward angle of the triangle, has at the center thereof a socket or prong, $c$, which lies at an angle to the plane of the triangle, as shown in Fig. 1, to receive a handle, $d$, and hold the same in the same inclined relation, so that when the gardener is operating the device the bed or frame part of the device will lie in or approximately in a parallel relation to the ground.

The sides $a^3\ a^3$ receive the draft from the prongs as they are drawn through the soil, and as a consequence would tend to spread and break where joined at the forward angle. To prevent such breaking, the said sides are joined at their rear ends by the base $a^4$.

The single handle $d$ lies in the longitudinal central line of the device in line with the forward angle formed by the triangle. When the gardener in his reciprocating operations forces the cultivator forward, the triangle acts as a wedge, and is adapted to force the leaves or branches of two contiguous plants apart, and thus allows the device to be introduced between, and in the return movement the device is thus provided with a clear path. At the angle opposite the handled side of the frame, where the sides $a^3\ a^3$ unite, the frame is raised out of the plane of the body thereof; or the ends of the sides $a^3\ a^3$ where they form the forward angle are bent up and form an arch at their union, and thus on the under side of said frame at the point of the angle the said frame is recessed, as at $a^2$, so as to give more room to the plant as it is being cultivated by the front teeth lying close to the angle on the opposite sides thereof. By this construction, also, in cultivating rows of plants of limited growth—such as those that have but newly sprung from seeds—the cultivator may be drawn along the ground and the prongs may be deeply embedded, and yet ample room be provided by said forward recess to allow the leaves, &c., to pass thereunder without injury. Such a recess in the base $a^4$ is unnecessary, as the gardener may conveniently raise said base; but such raising is not convenient or desirable in connection with the forward angular part of the cultivator, inasmuch as it is important to secure the deepest cultivation near the plant. To a certain extent the handle serves as a guide for the eye in keeping the cultivator so that the central raised part over the recess $a^2$ will be over the rows of plants just referred to.

The prongs $b\ b$ are disposed on the side parts, $a^3\ a^3$, in flaring series. They are backwardly bent, as shown in Figs. 1 and 3, and are thus adapted or tend to enter the ground as the cultivator is drawn along. The forward prong of each series lies away from the central longitudinal line of the device at each side of the recess $a^2$, and the teeth or prongs are turned away from said center line, so that there will be less liability of injuring the plants when drawn over the rows, as described.

The central parts of the triangle are open, as at $a$, to allow the operator to clearly see the relation of the forward prongs of the series to the row of plants. By having the triangle of one integral casting the use of rivets and such connections which would tend, unless the work of uniting the parts were very carefully attended to, to present catching projections, such as would injure the tender plants, and at the same time by such integral formation all rough joints are avoided at the angles, and the device withal is more durable and less liable to rust out.

The device thus described provides a tool that can be employed to advantage in various lines of gardening. Where the plants are small and in rows, the gardener has simply to walk backward, drawing his cultivator or reciprocating it as he walks, and the device works out the weeds and loosens the soil on each side of the said rows without injury to leaf or root. In other work, the peculiar wedge-like form, with the small or pointed end at the forward extremity, allows the device to be introduced between plants, and the pair of teeth at said forward end is adapted to enter the ground and cultivate in a limited space while the leaves, &c., are forced apart, and are not broken or otherwise damaged. In an ordinary backward draft the teeth of the oppositely-inclined series each take up or work upon a new piece or stretch of soil, as will be understood.

Having thus described the invention, what I claim as new is—

1. The improved hand-cultivator, combining a triangular frame, its two opposite sides provided with rearwardly-curved teeth, and their meeting ends curved or arched to form recess $a^2$, and the cross-bar or third side provided with a handle-connection and a handle, substantially as set forth.

2. The combination, with a single handle, of a three-sided frame, $a^3\ a^3\ a^4$, at the center of one side of which is formed a handle-connection to receive the handle, the other two sides of which are provided with backwardly-turned teeth and are united at the angle opposite said handle-connection, the said teeth being disposed away from said angle to form a plant-passage beneath the frame at the said angle in line with the said single handle, substantially as set forth.

In testimony that I claim the foregoing I have hereunto set my hand this 9th day of June, 1887.

KARL VOIGT.

Witnesses:
CHARLES H. PELL,
OSCAR A. MICHEL.